United States Patent [19]
Yoon

[11] Patent Number: 5,289,221
[45] Date of Patent: Feb. 22, 1994

[54] ZOOM LENS ASSEMBLY FOR A ZOOM CAMERA

[75] Inventor: Yongkyoo Yoon, Kyeongsangnam, Rep. of Korea

[73] Assignee: Samsung Aerospace Industries, Ltd., Kyeongsangnam, Rep. of Korea

[21] Appl. No.: 984,697

[22] Filed: Dec. 3, 1992

[30] Foreign Application Priority Data

Dec. 5, 1991 [KR] Rep. of Korea ............... 91-21376
Dec. 5, 1991 [KR] Rep. of Korea ............... 91-22201

[51] Int. Cl.$^5$ ............................................. G03B 1/18
[52] U.S. Cl. .................... 354/195.12; 354/286; 359/704
[58] Field of Search ............. 354/195.12, 286; 359/808, 811, 819–826, 676, 704

[56] References Cited

U.S. PATENT DOCUMENTS 4,506,959  3/1985  Hama ................................. 359/704

Primary Examiner—David M. Gray
Attorney, Agent, or Firm—Francis C. Hand

[57] ABSTRACT

A zoom lens assembly for a zoom camera wherein a focal length can be varied with a front move barrel moving forward and backward from a guide barrel by the rotation of a cam barrel installed inside a camera body.

This zoom lens assembly for a zoom camera includes an adhesive cement attached to the outer circumference of the cam barrel and a steel sheet coated on the adhesive cement in order to reduce the thickness of the outer circumference of the cam barrel considerably, and concurrently to improve the mechanical strength greatly; and a shading film and a shading member attached to the outer circumference of a shutter in order to block the external light permeating via the aperture between the front move barrel and the shutter.

11 Claims, 3 Drawing Sheets

ZOOM LENS ASSEMBLY FOR A ZOOM CAMERA

BACKGROUND OF THE INVENTION (1) Field of the Invention

The present invention relates to a zoom lens, more particularly to a zoom lens assembly for a zoom camera which heightens mechanical strength and improves shading efficiency between a front move barrel and a shutter.

(2) Description of the Prior Art

A zoom lens has an advantage of being capable of varying a focal length successively by adjusting an external ring.

A zoom lens has been used as an exchange lens of a single reflex camera. In recent days, a new kind of camera called a zoom camera has been further developed by mounting a zoom lens on a snapshot type camera.

Generally, a conventional zoom lens assembly for a zoom camera includes a guide barrel which is to be fixed to a camera body, a front move barrel which is telescopically mounted within the guide barrel and a cam barrel which is rotatably mounted about the guide barrel. In addition, the guide barrel is provided with a plurality of linear slots, the rotatable cam barrel is provided with a plurality of spiral slots, and one or more rollers is secured to the front move barrel to project through the linear slots of the guide barrel into the spiral slots of the cam barrel so that upon rotation of the cam barrel, the front move barrel is caused to move into and out of the guide barrel.

In addition, a lens group and a shutter are usually mounted at the front of the front move barrel.

A shading tape has also been coated on the outer circumference of rotatable cam barrel so as to prevent the permeation of light through the overlying slots of the cam barrel and guide barrel.

In order to be able to rotate the cam barrel, a ring gear has been provided at one end of the cam barrel so as to be driven by a suitable motor. Thus, upon activation of the motor, the front move barrel can be moved forward or backward so that the focal length of the lens group can be varied.

Typically, the cam barrel has been made of aluminum since such a material can be readily shaped and is of light weight. However, the mechanical strength of aluminum is weak so that the cam barrel must be made of a relatively large thickness. This, in turn, makes the size of the cam barrel relatively large. Thus, the bulk of the camera is increased and carrying of the zoom lens assembly becomes inconvenient.

Further, since the shutter is assembled in the direction of the axis of the front move barrel, care should be taken to avoid having an aperture between the shutter and the front move barrel through which light may pass.

SUMMARY OF THE INVENTION

This object of the present invention is to provide a zoom lens assembly for a zoom camera where the circumferential thickness of a cam barrel is extremely thin, but the mechanical strength is considerably improved, concurrently the aperture between the front move barrel and the shutter is perfectly blocked, so that the external light cannot permeate.

According to the above-described object, a zoom lens assembly is provided for a zoom camera wherein a focal length can be varied with a front move barrel moving forward and backward from a guide barrel by the rotation of a cam barrel installed inside a camera body.

Also, this zoom lens assembly for a zoom camera includes an adhesive cement attached to the outer circumference of the cam barrel and a steel sheet coated on the adhesive cement in order to reduce the thickness of the outer circumference of the cam barrel considerably, and concurrently to improve the mechanical strength greatly. A shading film and a shading member are also attached to the outer circumference of a shutter in order to block the external light permeating via the aperture between the front move barrel and the shutter.

The object as well as the attendant advantage of the present invention will become apparent from the following detailed description of the preferred embodiments when taken in conjunction with the accompanying drawings.

DESCRIPTION OF THE PREFERRED EMBODIMENTS

Figure 3:
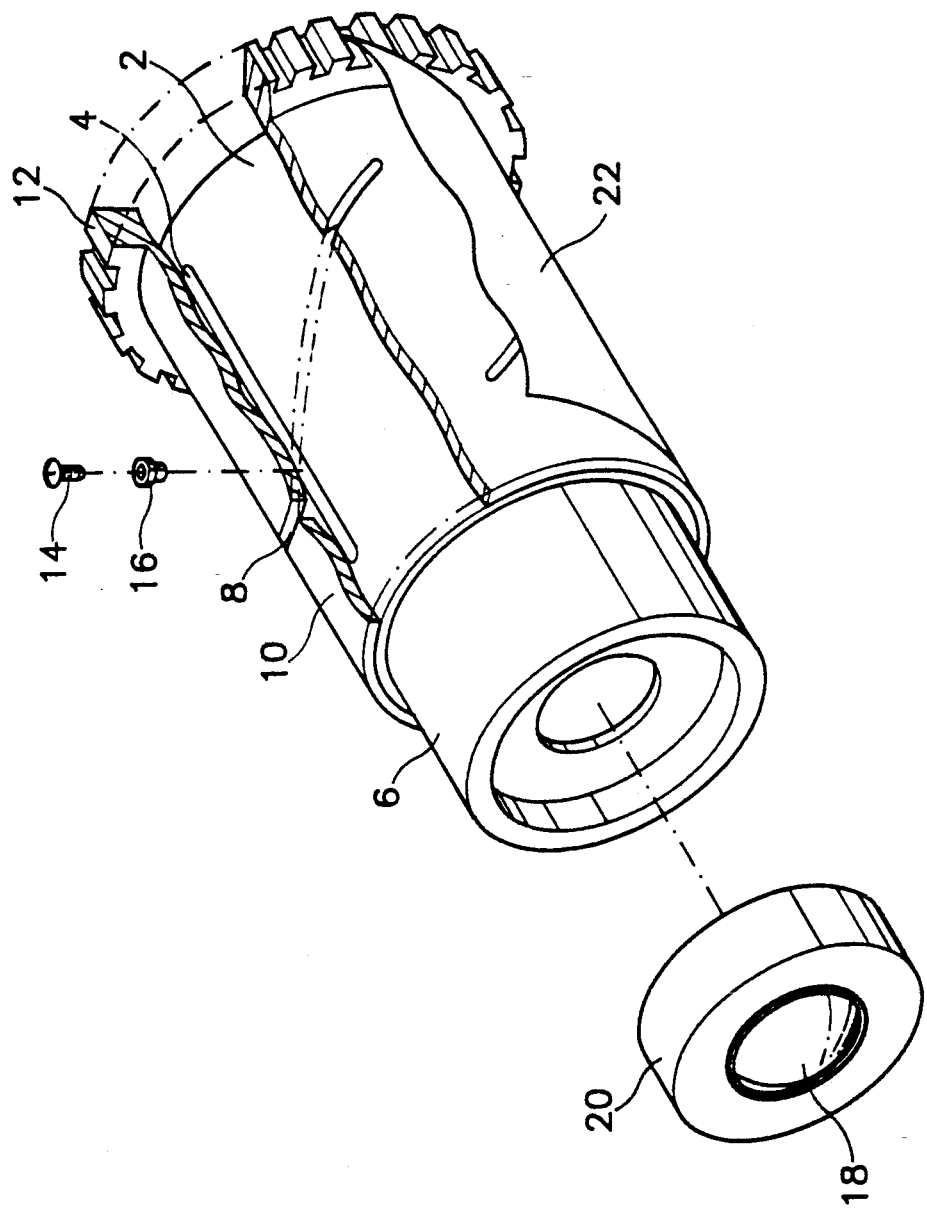
FIG. 3 is an exploded perspective view showing the construction of a prior art zoom lens assembly for a zoom camera.

Referring to FIG. 3, the zoom lens of conventional structure includes a guide barrel 2 which is fixed to a camera body (not shown) and which is provided with a plurality of linear slots 4 in the outer circumference. In addition, a front move barrel 6 is rotatably mounted within the guide barrel 2 while a cam barrel 10 is rotatably mounted on the outer surface of the fixed guide barrel 2. As indicated, the cam barrel 10 has a plurality of spiral slots 8 formed in the outer circumference. In addition, a ring gear 12 is provided at one end of the cam barrel 10.

A roller 16 is mounted on the outer circumference of the front move barrel 6 by a set screw 14 and is positioned at an intersection point between a spiral slot 8 of the cam barrel 10 and a linear slot 4 of the guide barrel 2. A lens group 18 and a shutter 20 are mounted at the front of the front move barrel 6 while a shading tape 22 is applied on the outer circumference of the cam barrel 10.

When the cam barrel 10 is rotated, the roller 16 slides along the linear slot 4. As a result, the front move barrel 6 moves forward or backward depending upon the direction of rotation and the focal length of the lens 18 is varied. This rotation of the cam barrel 10 is caused by driving the ring gear 12.

Figure 1:
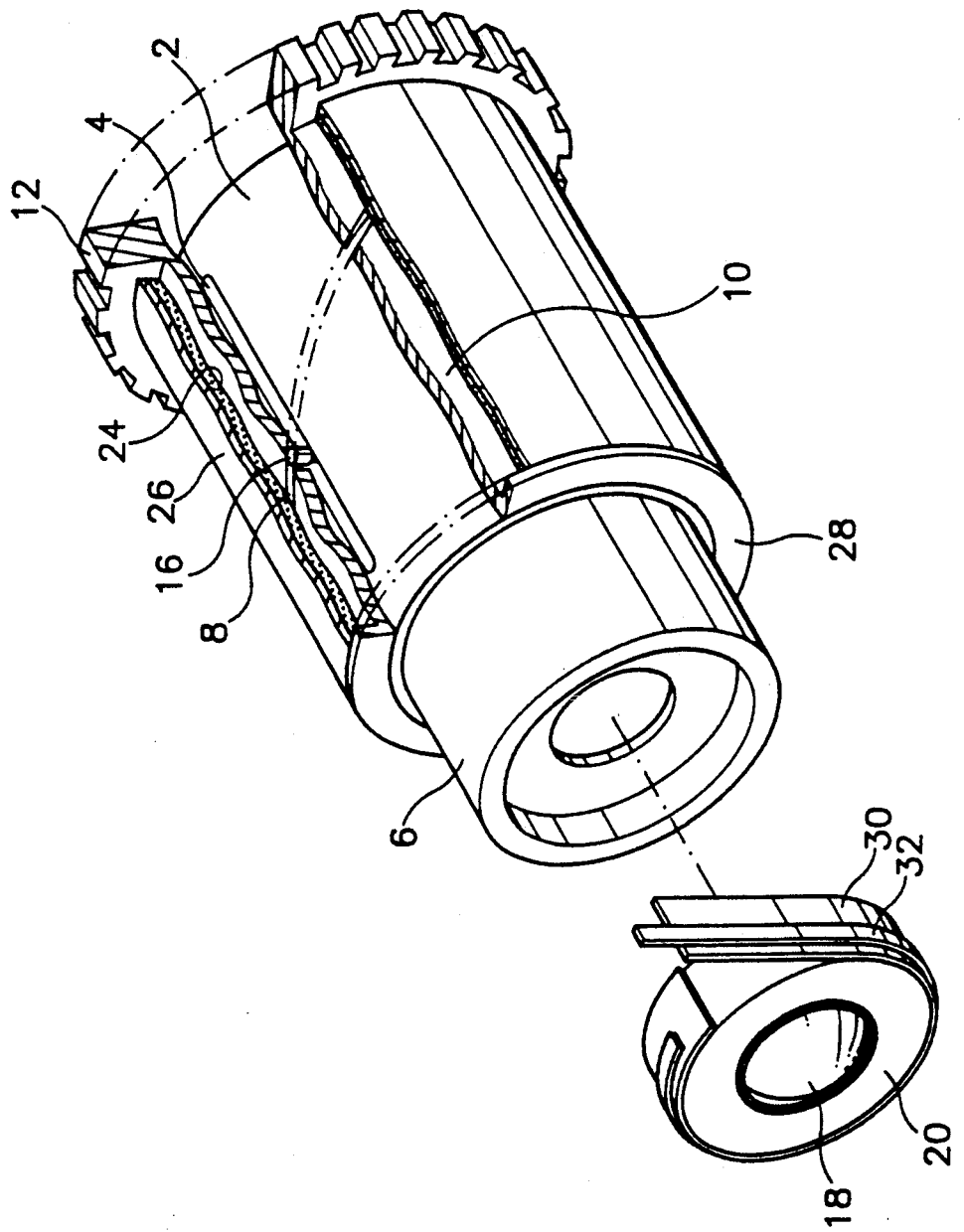
FIG. 1 is an exploded perspective view of a zoom lens assembly showing the construction of the principal parts according to the present invention.
Figure 2:
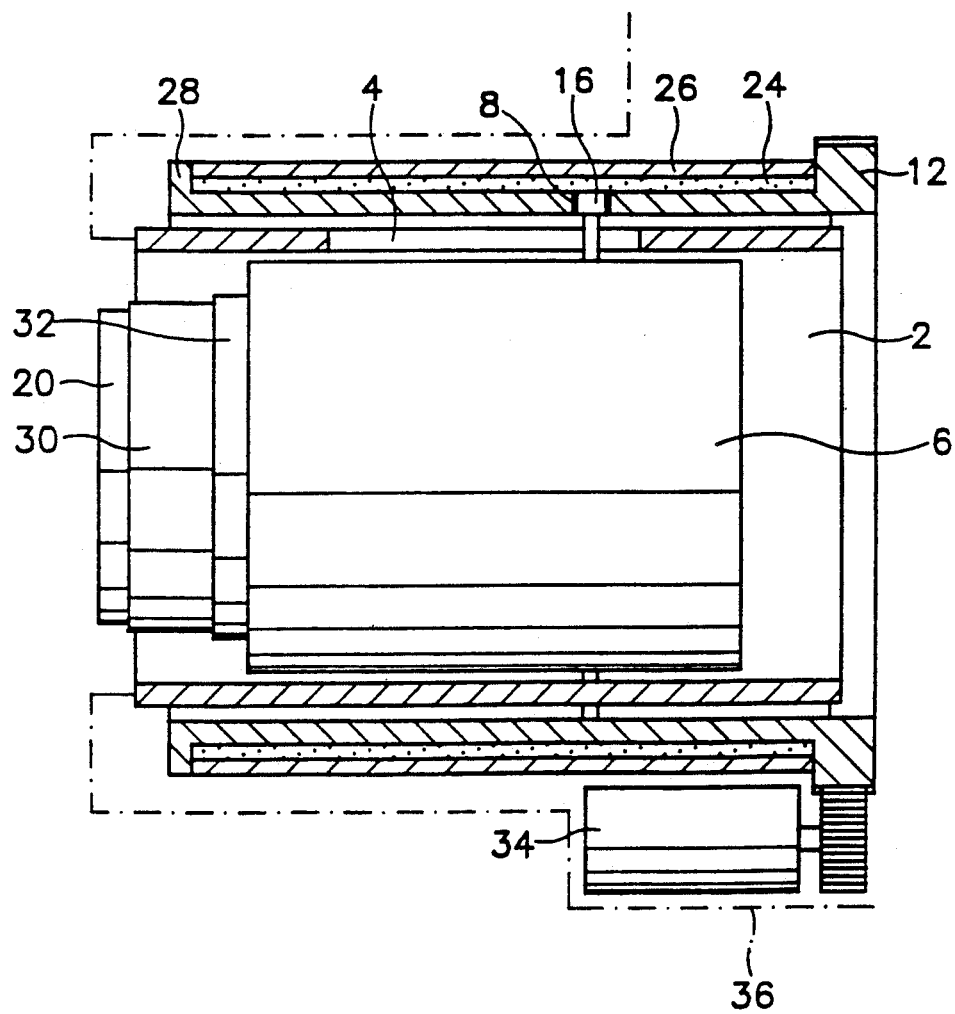
FIG. 2 is a side sectional view of the construction of the principal parts of FIG. 1 according to the present invention.

Referring to FIGS. 1 and 2, wherein like reference characters indicate like parts as above, a front move barrel 6 is placed to be able to slide inside a guide barrel 2, and a cam barrel 10 is arranged to be able to rotate on the circumference of the guide barrel 2.

A plurality of rollers 16 are mounted on the outer circumference of the front move barrel 6 and are arranged at an intersection point between a spiral slot 8 of the cam barrel 10 and a linear slot 4 of the guide barrel 2. Thus, the front move barrel 6 is able to move reciprocally into and out of the guide barrel 2 in response to rotation of the cam barrel 10 in the guide barrel 2.

As shown, a first lenses group 18 and a shutter 20 are installed at the front of the front move barrel 6, and a layer of an adhesive cement 24 having a shading effect is coated on the outer circumference of the cam barrel 10. In addition, a layer of steel sheet 26 is covered over the adhesive cement 24 to rigidify the relatively thin cam barrel 10.

The steel sheet 26 can be attached by the adhesive cement 24 not to move, however a projection part 28 in the form of an outwardly directed radial flange at the front end of the cam barrel 10 defines the position of the steel sheet 26 more definitely.

Besides, the outer height of the projection part 28 itself defines the thickness of the cam barrel 10 substantially. Further, the projection part 28 serves to define an annular channel receiving the cement layer 24 and steel layer 26.

More particularly, the thickness of the cam barrel 10 is determined by the sum of the thickness of the outer circumference of the cam barrel 10, the thickness of the adhesive cement 24 and the thickness of the steel sheet 26. The thickness of the cam barrel 10 is defined almost to the same degree as the height of the projection part 28 in the present invention.

The mechanical strength of the cam barrel 10 is considerably improved by the steel sheet 26 coated on the outer circumference of the cam barrel 10.

The steel sheet 26 plays a part of reducing the thickness of the cam barrel 10 itself to a half compared with the prior art, and improving the mechanical strength more than two times. For example, the actual thickness of the prior art cam barrel shown in FIG. 3 is 3 millimeters.

The shutter 20 mounted on the front move barrel 6 is coated by a shading film 30, and a shading member 32 made of a sponge-like material such as a foamed rubber is coiled on the shading film 30 to abut against the front move barrel 6.

As shown in FIG. 2, the shading film 30 coated on the outer circumference of the shutter 20 prevents external light from permeating into the front move barrel 6 via the outer circumference of the shutter 20, and the aperture between the front move barrel 6 and the shutter 20 is covered by the shading member 32.

A ring gear 12 of the cam barrel 10 is engaged to rotate clockwise and counterclockwise by an ordinary servo motor 34 inside the camera body 36.

As described above, the zoom lens assembly has the advantages that: the thickness of the outer circumference of the cam barrel 10 is considerably reduced, but the mechanical strength is greatly improved, as the projection part 28 is formed at the edge of the outer circumference of the cam barrel 10, and the steel sheet 26 is coated on the outer circumference of the cam barrel 10; a good quality of photography can be obtained, since the external light via the aperture between the front move barrel 6 and the shutter 20 is blocked by adhering the shading film 30 and the shading member 32 on the outer circumference of the shutter 20.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. In a zoom lens assembly for a zoom camera including
  a cam barrel placed to be able to rotate on an outer circumference of a guide barrel inside a camera body; and
  a front move barrel placed inside said guide barrel, so that a focal length is varied, with the front move barrel moving forward and backward from said guide barrel by the rotation of said cam barrel: the improvement comprising;
  an adhesive cement having the shading effect adhered to the outer circumference of said cam barrel;
  a steel sheet coated on said adhesive cement;
  a shading film coated on the outer circumference of a shutter installed on said front move barrel; and
  a shading member attached to the outer circumference of said shading film.

2. A zoom lens assembly for a zoom camera according to claim 1, wherein the thickness of said cam barrel is substantially defined by an outer height of a projection part.

3. A zoom lens assembly for a zoom camera according to claim 1, wherein said shading member is made of sponge.

4. In a zoom lens assembly for a zoom camera, the combination of
  a guide barrel for mounting on a camera body;
  a cam barrel of relatively thin thickness rotatably mounted on said guide barrel;
  a front move barrel reciprocally mounted inside said guide barrel and connected to said cam barrel for selectively moving reciprocally into and out of said guide barrel in response to rotation of said cam barrel on said guide barrel;
  a layer of adhesive cement on an outer surface of said cam barrel; and
  a thin layer of steel on said layer of adhesive cement for rigidifying said relatively thin cam barrel.

5. The combination as set forth in claim 4 wherein said cam barrel has an outwardly directed radial flange at one end to define an annular channel in said cam barrel receiving said cement layer and said steel layer therein in recessed manner.

6. The combination as set forth in claim 4 wherein adhesive cement has a shading effect characteristic to shade any light reflected thereon.

7. The combination as set forth in claim 4 which further comprises a shutter mounted within and projecting from said move barrel and a shading film on an outer circumferential surface of said shutter.

8. The combination as set forth in claim 7 which further comprises an annular shading member mounted over said shading film in abutment with said move barrel.

9. In a zoom lens assembly for a zoom camera, the combination of
  a guide barrel for mounting on a camera body;
  a cam barrel of relatively thin thickness rotatably mounted on said guide barrel;
  a front move barrel reciprocally mounted inside said guide barrel and connected to said cam barrel for selectively moving reciprocally into and out of said guide barrel in response to rotation of said cam barrel on said guide barrel;

a layer of adhesive cement having a shading effect characteristic on an outer surface of said cam barrel;

a layer of steel on said layer of cement for rigidifying said cam barrel;

a shutter mounted within and projecting from said move barrel; and a shading film on an outer circumferential surface of said shutter.

10. The combination as set forth in claim 9 which further comprises an annular shading member mounted over said shading film in abutment with said move barrel.

11. In a zoom lens assembly for a zoom camera, the combination of a guide barrel for mounting on a camera body;

a cam barrel of relatively thin thickness rotatably mounted on said guide barrel;

a front move barrel reciprocally mounted inside said guide barrel and connected to said cam barrel for selectively moving reciprocally into and out of said guide barrel in response to rotation of said cam barrel on said guide barrel;

a shutter mounted within and projecting from said move barrel;

a shading film on an outer surface of said shutter; and an annular shading member mounted over said film in abutment with said move barrel to prevent external light from permeating between said shutter and said move barrel.

* * * * *